Figure 1:
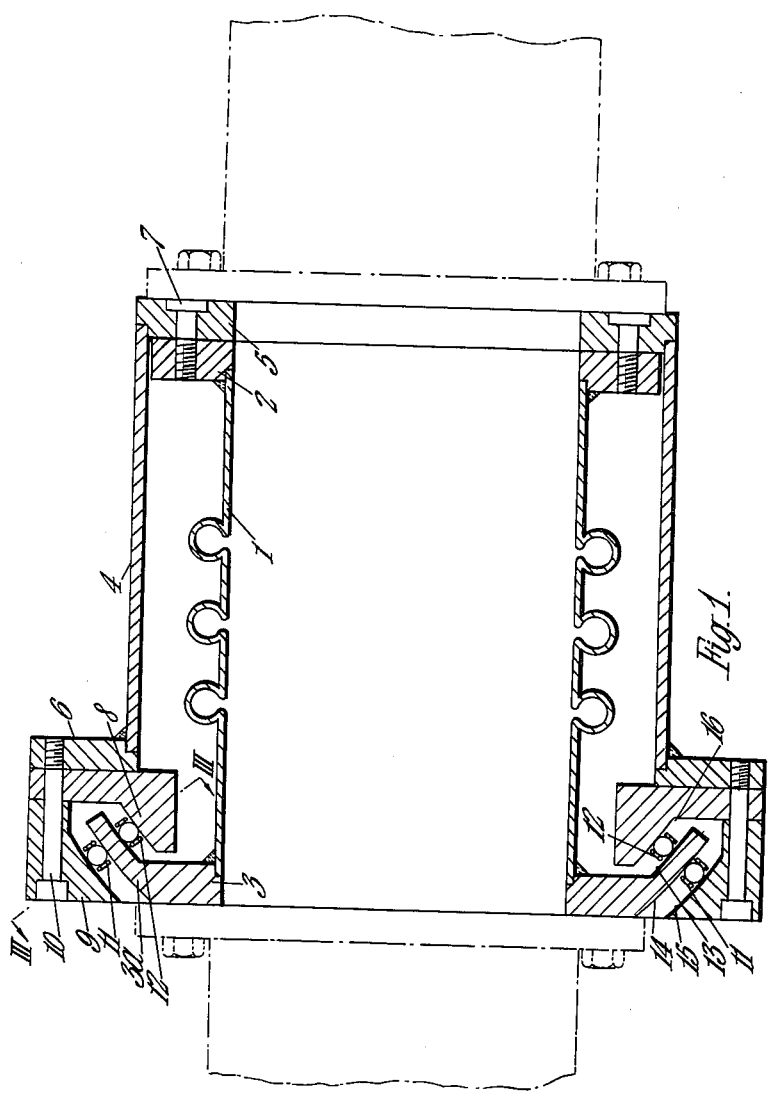

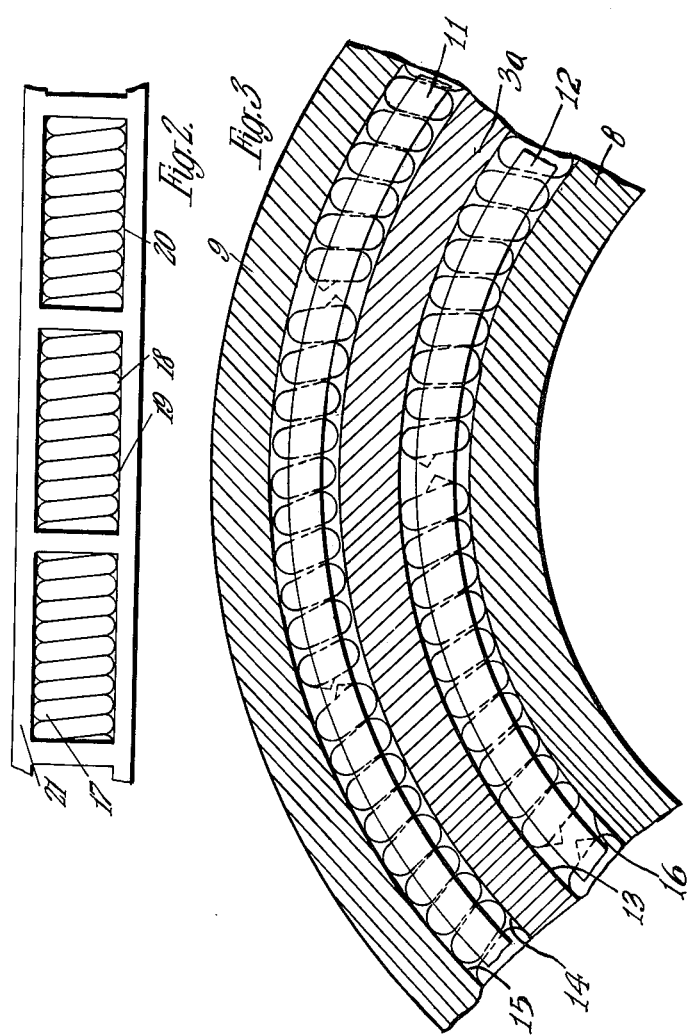

United States Patent Office 3,232,642
Patented Feb. 1, 1966

3,232,642
FLEXIBLE PIPE JOINTS
Peter H. Cleff, John D. Watson, and Alexander E. Anderson, Wallsend-on-Tyne, England, assignors to Pametrada, Wallsend, Northumberland, England, a British corporation
Filed May 14, 1963, Ser. No. 280,332
6 Claims. (Cl. 285—114)

The present invention relates to flexible pipe or duct joints for use wherever allowance must be made for axial and/or angular misalignment of pipes or ducts connected by said joints and in which a flexible jointing member is of such a form that it cannot by itself withstand the misalignment and/or axial loads imposed by, for instance internal or external pressure, temperature differences or changes and/or movements of pipe (or duct) anchorages.

The present invention consists in a flexible pipe or duct joint comprising a flexible jointing member whose end portions are for attachment to the ends of said pipes or ducts, and at least one pair of continuous transverse (with respect to the jointing member) internal and external circular tracks, respective tracks of each pair being rigidly connected to respective end portions of the flexible jointing member, at least one circumferential flexible element being interposed between each pair of tracks to support said axial loads on at least one of said end portions whilst allowing angular misalignment between these end portions in any plane through a predetermined centre.

The profiles in an axial section of each pair of circular tracks where in contact with the flexible element interposed between them, are so shaped as to control the angular misalignment of the flexible jointing member within such limits as may be considered necessary to prevent overstress of such member.

The flexible element or elements circumferentially interposed between said pair or pairs of circular tracks are of such shape and size as adequately to support the misalignment loads whilst at the same time permitting such limited misalignment with a minimum of reactive forces on the pipes connected by said joint. These flexible elements need not be continuous along the whole length of the tracks, but must be of such a length and distribution as to give adequate support. Each element is preferably in the form of caged helical springs, these springs being in tandem with their axes lying in the circumferential direction.

If axial loads are expected to occur in one direction alone, then only that set of circular tracks and the associated flexible element or elements appropriate to such loading may be used, a further set not being necessary. However, it is more usual to provide two of said pairs of circular tracks and associated elements, one of the pairs for withstanding loads on the flexible jointing member in one axial direction and the other pair for withstanding loads in the other axial direction. If two pairs of tracks are used, these may be defined by a circular skirt portion attached to one end portion of said flexible jointing member protruding into an annular channel defined in a member attached to the other end of said flexible jointing member.

Normally, both tracks of each pair will be parallel to one another, and it is preferred that said tracks are of frusto-spherical shape, the centre of the sphere being the centre of angular movement of the flexible jointing member; however, said tracks may be of frusto-conical shape for large diameter joints. The flexible jointing member may be of an extensible bellows construction or any other suitable construction such as rubber hose.

Figure 4:
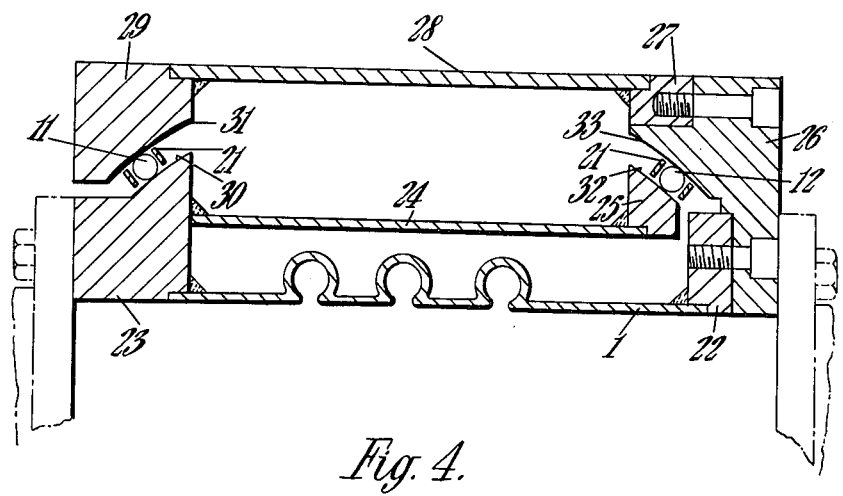
Figure 5:
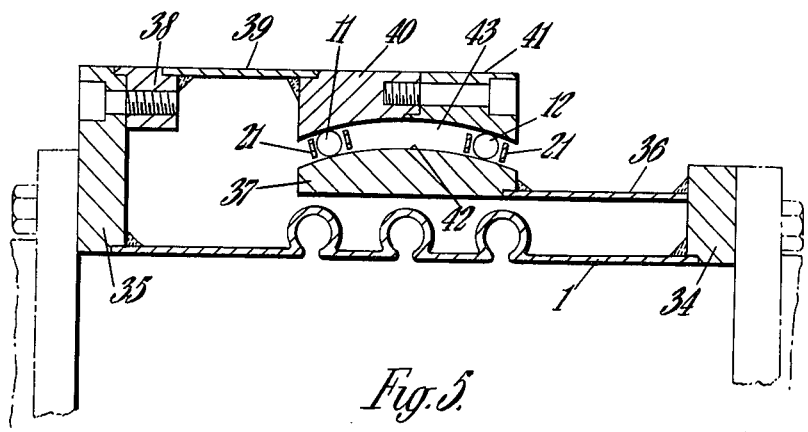

Referring to the accompanying diagrammatic drawings which illustrate, by way of example, possible modes of carrying the invention into effect:

FIGURE 1 shows an axial section through a flexible pipe or duct joint;
FIGURE 2 shows details of the flexible elements of FIGURE 1;
FIGURE 3 is a transverse section on the line III—III of FIGURE 1, through the circular tracks and the flexible elements interposed between them;
FIGURE 4 shows an axial section through part of another flexible pipe or duct joint; and
FIGURE 5 shows an axial section through part of yet another flexible pipe or duct joint.

In FIGURE 1 a flexible pipe or duct jointing member comprises a cylindrical bellows unit 1 with annular flanges 2 and 3 welded or otherwise secured to the respective ends thereof. The bellows unit is disposed within a sleeve member 4 welded to integral flanges 5 and 6, the flanges 5 being rigidly attached to the flange 2 by means of bolts 7.

An integral extension 3a of the flange 3 forms circumferential tracks 13 and 14, whilst an inner circular track ring 8 and an outer circular track ring 9, secured to the flange 6 by means of bolts 10, form respectively tracks 16 and 15.

Flexible elements 11 and 12 are respectively interposed between the tracks 14 and 15 and between tracks 13 and 16.

The interposed flexible elements 11 and 12 are shown in the developed view of FIGURE 2 and comprise a multiplicity of circular helical springs 17, 18, each spring being held in a suitably shaped opening 19, 20 of a continuous cage ring 21. The radial dimension of said cage ring is such that should failure of the helical springs occur in service, the cage ring itself can act as an emergency support to prevent damage to the bellows unit 1 due to overstressing it in an axial direction.

FIGURE 3 is a transverse section along a radial line from the centre of movement of the flexible joint and shows the track members 9, 3a and 8, track pairs 15 and 14 and 13 and 16 and the flexible elements 11 and 12 in their respective radial positions.

From the foregoing it will be appreciated that any axial loads on the joint in a direction tending to expand the flexible bellows 1 are taken by the outer flexible member 11 through the circular tracks 14 and 15 and any axial loads tending to compress the bellows are taken by the inner flexible member 12 through the circular tracks 13 and 16.

During assembly, the axial lengths of the circular track members 8 and 9 are adjusted so that the helical springs in the flexible elements 11 and 12 are compressed diametrically by a predetermined amount between the circular track pairs 14 and 15 and 13 and 16 respectively, thereby determining the angular stiffness of the compound structure.

In this example, the transverse circular tracks 13, 14, 15 and 16 are shown with frusto-spherical surfaces having a common centre, which is the centre of angular movement of the flexible bellows element 1. Thus, because of the preload applied to the flexible elements 11 and 12, any angular misalignment of the flexible bellows flanges 2 and 3 must take place relative to this centre.

In FIGURE 4 a cylindrical bellows unit 1 has annular flanges 22 and 23 welded or otherwise secured to its respective ends. An inner sleeve member 24 is welded or otherwise secured to the flange 23 and carries (e.g., by welding) an inner track ring 25, whilst a first outer track ring 26 is secured (e.g., by bolting) to the flange 22 and in turn carries a flange 27 (e.g., by bolting) to which is welded or otherwise secured an outer sleeve member 28; this outer sleeve member 28 carries (e.g., by welding) a second outer track ring 29.

Tracks 30 and 31 are defined by the flange 23 and the second outer track ring 29 respectively, and tracks 32 and 33 are defined by the inner track ring 25 and the first outer track ring 26 respectively. Tracks 30, 31, 32 and 33 have a common centre of curvature which defines the centre of alignment of the joint.

In FIGURE 5 a cylindrical bellows unit 1 has annular flanges 34 and 35 welded or otherwise secured to its respective ends. A first sleeve member 36 is secured (e.g., by welding) to the flange 34 and carries (e.g., by welding) an inner track ring 37. The flange 35 carries (e.g., by bolting) another flange 38 which in turn carries (e.g., by welding) a second sleeve member 39. This second sleeve member 39 carries (e.g., by welding) a first outer track ring 40 to which is secured (e.g., by bolting) a second outer track ring 41.

Track 42 is defined by the inner track ring 37 whilst track 43 is defined by the cooperating outer track rings 40 and 41. Tracks 42 and 43 have a common centre of curvature which defines the centre of alignment of the joint.

In FIGURES 4 and 5, the flexible elements 11 and 12 correspond to those shown in FIGURE 1 as regards the axial direction of loading which they respectively withstand, and these elements 11 and 12 are shown as being formed substantially as described with reference to and as shown in FIGURE 2, although other forms of these elements 11 and 12 are possible. The pipes or ducts are shown as being bolted to either end portions of the joints, in chain-dotted lines, but it will be appreciated that the pipes or ducts may be connected to the joints by any suitable means, the pipes or ducts and/or the joints being modified as is found desirable.

The misalignment characteristics of the joint may be varied to suit the installation requirements by adjustment of the centre of misalignment and/or the shape of the circular track surfaces.

If axial loads occur in one direction only then only that set of circular tracks and flexible elements appropriate to such loading may be used, the second set being redundant.

We claim:

1. A flexible pipe joint comprising a flexible conduit, means on opposite ends of said conduit for coupling to opposed ends of pipes to be joined, at least one pair of circular, concentric, partly spherical, spaced, parallel tracks, said tracks being disposed transversely of said joint, one track providing an internal bearing surface and the other track providing an opposed external bearing surface, means for rigidly connecting one track to one end of a rigid connecting member, the opposite end of said connecting member being rigidly connected to one end of said conduit, means for rigidly connecting the other track to the opposite end of said conduit, and at least one annular flexible bearing element disposed between and in engagement with each of said tracks, said flexible bearing element comprising a coil spring, contiguous convolutions of said spring being in intimate contact adjacent said external surface and being spaced adjacent said internal surface, whereby said spring is substantially devoid of tension tending to reduce the diameter thereof, said joint permitting angular misalignment of said pipes and said bearing member serving to support at least a component of an axial load on said joint in at least one direction.

2. A flexible pipe joint as defined in claim 1, in which said annular flexible bearing element comprises a plurality of coil springs disposed in end-to-end relationship, and a circular cage member having circumferentially spaced circumferentially elongated radial openings, each spring being disposed in one of said openings.

3. A flexible pipe joint as defined in claim 1 in which two pairs of said circular tracks and two flexible bearing elements are provided, means for rigidly securing one track of one pair to one end of said flexible conduit, means for rigidly securing the other track of said one pair to the opposite end of said flexible conduit, means for rigidly securing one track of the second pair to said one end of said flexible conduit, and means for rigidly securing the other track of said second pair to said opposite end of said conduit, one of said bearing elements being disposed between said one pair of tracks and the other of said bearing elements being disposed between said second pair of tracks, whereby said bearing elements will support components of the axial loads in opposite directions while permitting angular misalignment of said pipes.

4. A flexible pipe joint as defined in claim 3, in which an inner circular track ring and an outer circular track ring provide an annular channel, said inner ring having an external bearing surface thereon, said outer ring having an internal bearing surface thereon, means for rigidly securing said rings to one end of said flexible conduit, a circular skirt portion projecting into said channel, means for rigidly securing said skirt portion to the opposite end of said flexible conduit said skirt portion having an internal bearing surface opposed to said external bearing surface and having an external bearing surface opposed to said first mentioned internal bearing surface, one of said bearing elements being disposed between said inner ring and said skirt and the other bearing element being disposed between said outer ring and said skirt, whereby said bearing elements will support components of the axial loads in opposite directions while permitting angular misalignment of said pipes.

5. A flexible pipe joint as defined in claim 1, in which said tracks are of frusto-spherical formation, the centers of said spheres coinciding with the center of angular movement of said flexible conduit.

6. A flexible pipe joint as defined in claim 1, in which said means for rigidly connecting one track to one end of said conduit comprises a sleeve surrounding said conduit, said one track being secured to one end of said sleeve, the opposite end of said sleeve being secured to said one end of said conduit.

References Cited by the Examiner

UNITED STATES PATENTS

| | | | |
|---|---|---|---|
| 1,909,526 | 5/1923 | Falge | 287—12 |
| 2,616,728 | 11/1952 | Pitt | 285—166 |
| 2,712,456 | 7/1955 | McCreez | 285—226 |
| 2,840,394 | 6/1958 | Rohr | 285—226 |
| 2,846,242 | 9/1958 | Drake | 285—263 |
| 2,998,270 | 8/1961 | Watkins | 285—227 |
| 3,065,005 | 11/1962 | Hall | 285—318 |
| 3,089,714 | 5/1963 | Croy | 285—301 |
| 3,165,339 | 1/1965 | Faccou | 285—263 |

FOREIGN PATENTS 360,464 6/1938 Italy.

CARL W. TOMLIN, *Primary Examiner.*

R. GIANGIORGI, *Assistant Examiner.*